No. 892,965. PATENTED JULY 7, 1908.
J. SEVCIK.
CHAIN.
APPLICATION FILED OCT. 17, 1907.
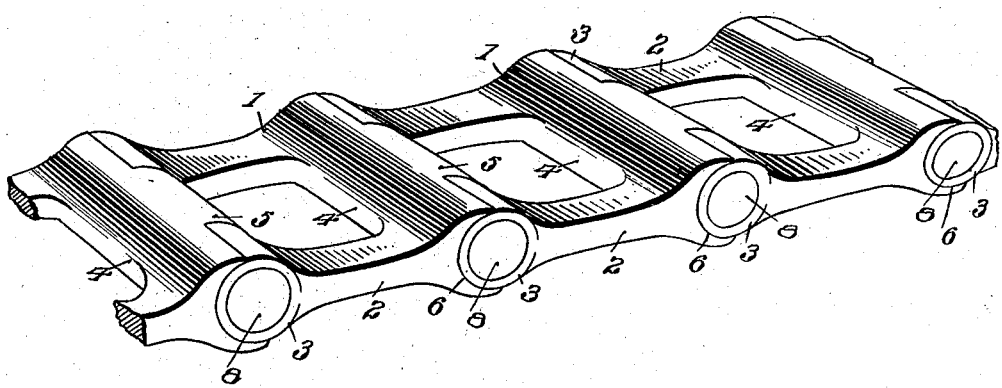
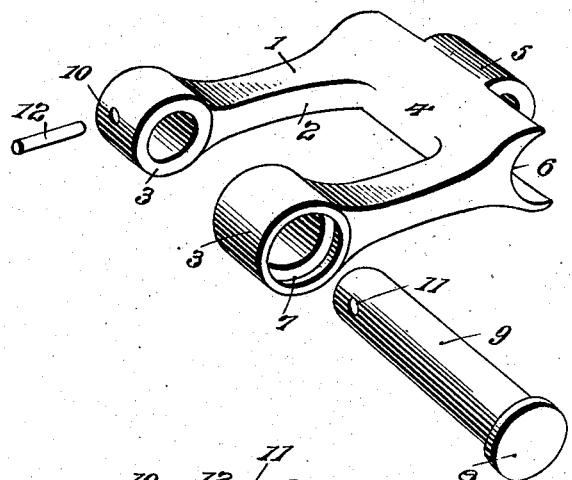
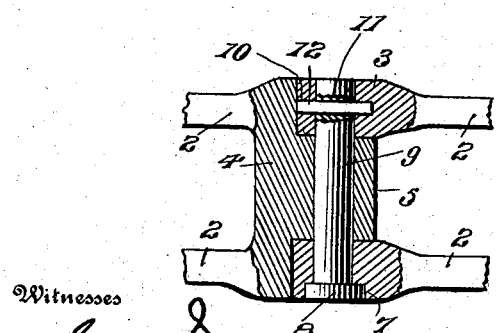
Inventor
Joseph Sevcik.
Witnesses
By
Attorneys

UNITED STATES PATENT OFFICE.

JOSEPH SEVCIK, OF NEW ERA, OREGON, ASSIGNOR OF ONE-HALF TO JOSEPH HOFFMAN, OF NEW ERA, OREGON.

CHAIN.

No. 892,965.　　　　Specification of Letters Patent.　　　Patented July 7, 1908.

Application filed October 17, 1907. Serial No. 397,855.

*To all whom it may concern:*

Be it known that I, JOSEPH SEVCIK, citizen of the United States, residing at New Era, in the county of Clackamas and State of Oregon, have invented certain new and useful Improvements in Chains, of which the following is a specification.

This invention contemplates certain new and useful improvements in driving chains for transmitting motion from one part to another, and the invention has for its object a chain of this character, the links of which are peculiarly constructed and connected together so as to secure the characteristics of simplicity and durability, the several links of the chain being securely held together while in their normal operative position and being susceptible to ready detachment when turned to a sufficient angle with respect to each other to permit of the extraction of the locking pins hereinafter specifically described.

With this and other objects in view as will more fully appear as the description proceeds, the invention consists in certain constructions, arrangements and combinations of the parts which I shall hereinafter fully describe and claim.

For a full understanding of the invention, reference is to be had to the following description and accompanying drawings, in which:

Figure 1 is a perspective view of several links of the chain, constructed in accordance with my invention; Fig. 2 is a similar view of one link with the pintle and locking pin detached and in juxtaposition to the link; and, Fig. 3 is a top plan view of two connected links partly broken away to show the locking pin.

Corresponding and like parts are referred to in the following description and indicated in all the views of the drawings by the same reference characters.

Referring to the drawing, the numeral 1 designates the links of a chain constructed in accordance with my invention, each link being formed with spaced arms 2 provided at their ends with apertured knuckles 3. The cross bar 4 of each link is formed at its middle with a transversely apertured knuckle 5 adapted to fit in between the knuckles of the next adjacent link, as shown, and the ends of the cross bar on both sides of the knuckle 5 are recessed, as indicated at 6.

One knuckle 3 of each link is formed with a countersink 7 adapted to receive the head 8 of a pintle 9 which is intended to be inserted through the knuckles 3 and 5 to pivotally secure the links together to form a completed chain of the desired length. An opening 10 is formed through one of the knuckles 3, preferably the one opposite to that formed with a countersink and the pintle 9 is formed with a transverse opening 11 designed to register with the opening 10 so as to receive a locking pin 12 to lock the pintle in the knuckles.

It is to be particularly noted that the opening 10 formed in one of the knuckles 3 is in alinement with the respective side arm 2 of the link and that the locking pin 12 is therefore covered in the normal position of the parts by one of the recessed ends 6 of the next adjacent link in the series, so as to securely prevent the accidental removal of the locking pin during the operation of the chain. At the same time, it is obvious that the said pin may be extracted whenever desired by turning one link with respect to its companion link into a position where the locking pin will be exposed.

Having thus described the invention, what is claimed as new is:

1. The herein described chain, embodying links, each of which consists of spaced side arms and a cross-bar, the cross-bar being formed at its middle with a knuckle, and the side arms being formed with knuckles designed to embrace the cross-bar and knuckle of the next adjacent link, the knuckle of one side arm being formed at its outer side with a countersink, and the knuckle of the other side arm being formed with an opening extending therethrough and in alinement with the said side arm, and a pintle extending through the several knuckles and formed at one end with a head fitting in said countersink, the other end of said pintle being formed with an opening adapted to register in the knuckle of the opposite side arm, and a locking pin inserted through the openings of the knuckle and pintle, the cross-bar being formed at opposite sides of its knuckle with recessed ends adapted to extend partially around the knuckles of the said arms of the adjacent link, and one of said recessed ends being adapted to cover the locking pin, as and for the purpose set forth.

2. The herein described chain, consisting of links, each of which consists of a cross-bar and two spaced side arms, the cross bar being formed at its middle with a knuckle and the side arms being formed at their ends with knuckles adapted to embrace the cross-bar knuckle of the adjacent link, each cross-bar being formed with recessed ends at opposite sides of the knuckle; a pintle extending through the registering knuckles, and a locking pin extending through one of said knuckles and the pintle and adapted, in the operative position of the parts to be covered by one of the said recessed ends.

3. The herein described chain, consisting of links, each of which consists of a cross bar and two spaced side arms, the cross bar being formed with a knuckle and the side arms being formed at their ends with knuckles adapted to embrace the cross bar knuckle of the adjacent link, a pintle extending through the registering knuckles, and detachable locking means securing the pintle in place and arranged in the operative position of the parts to be covered by the ends of the adjacent cross bar.

In testimony whereof I affix my signature in presence of two witnesses.

JOSEPH SEVCIK. [L. S.]

Witnesses:
  GRANT BALIWINK,
  W. A. DIMICK.